United States Patent [19]
Billington

[11] Patent Number: 6,076,441
[45] Date of Patent: Jun. 20, 2000

[54] TOOL BLOCK AND HOLDER FOR METAL WORKING LATHES

[76] Inventor: Steven R. Billington, 204 E. Wilson St., Bryant, Ind. 47326

[21] Appl. No.: 09/311,130

[22] Filed: May 13, 1999

[51] Int. Cl.⁷ .................................................... B23B 31/02
[52] U.S. Cl. ................................ 82/160; 82/901; 407/11; 408/239 R
[58] Field of Search ............................. 82/160, 158, 901; 409/233; 407/11, 100, 101; 408/56, 59, 60, 61, 239 R, 239 A

[56] References Cited

U.S. PATENT DOCUMENTS

| | | | |
|---|---|---|---|
| 2,456,776 | 12/1948 | Faust ............................................. | 279/6 |
| 2,626,667 | 1/1953 | Spiller .................................... | 408/59 X |
| 2,771,297 | 11/1956 | Nipken ........................................ | 279/6 |
| 2,793,041 | 5/1957 | Barbier et al. ............................... | 279/6 |
| 2,869,879 | 1/1959 | Burton ........................................ | 279/6 |
| 3,451,686 | 6/1969 | Hammond ................................... | 279/51 |
| 4,014,439 | 3/1977 | Kochsiek et al. ......................... | 408/151 |
| 4,655,631 | 4/1987 | Mitchell .................................. | 403/349 |
| 4,682,521 | 7/1987 | Duenas . | |
| 4,740,116 | 4/1988 | Wellach ..................................... | 408/59 |
| 4,823,656 | 4/1989 | Weil .......................................... | 82/159 |
| 4,875,397 | 10/1989 | Berdichevsky .............................. | 82/60 |
| 5,193,954 | 3/1993 | Hunt ...................................... | 82/160 X |
| 5,244,322 | 9/1993 | Schweizer et al. .................... | 82/160 X |
| 5,378,091 | 1/1995 | Nakamura ............................. | 407/11 X |
| 5,388,487 | 2/1995 | Danielsen .................................. | 82/158 |
| 5,402,696 | 4/1995 | Hecht et al. ............................... | 82/158 |
| 5,417,131 | 5/1995 | Robertson ................................. | 82/158 |

FOREIGN PATENT DOCUMENTS

| | | | |
|---|---|---|---|
| 44-18429 | 8/1969 | Japan ......................................... | 279/6 |
| 120507 | 12/1947 | Sweden .................................... | 279/6 |
| 120541 | 12/1947 | Sweden .................................... | 279/6 |
| 846287 | 7/1981 | U.S.S.R. .................................... | 279/6 |

*Primary Examiner*—Henry W. H. Tsai
*Attorney, Agent, or Firm*—Clifford W. Browning; Woodard, Emhardt, Naughton, Moriarty & McNett Patent and Trademark Attorneys

[57] ABSTRACT

A tool block and holder for metal working lathes, comprising, a tool block having a tool channel extending therethrough sized to receive snugly a collet holder with a collar at its proximate end serving as a stop against the tool block, and first coolant channel that communicates a fluid coolant from a source external to the tool block to the tool channel at a point beyond the distal end of the collet holder; a collet sized to be received snugly within the collet holder and having a hollow interior and a nose at its proximate end with an opening sized to receive the shank of a metal working tool and having male threads at its distal end; and a draw nut having a proximate end sized to be received snugly within the tool channel, female threads at its proximate end sized to receive the male threads at the distal end of the collet, a flange at the distal end of the draw nut serving as a stop against the tool block, and second coolant channel in fluid communication with the first coolant channel and the hollow interior of the collet when the flange of has been stopped against the tool block.

4 Claims, 3 Drawing Sheets

TOOL BLOCK AND HOLDER FOR METAL WORKING LATHES

The present invention relates generally to tool holders and tool blocks for metal working lathes, and more particularly to tool holders and tool blocks for metal working lathes that permit metal working tools to be more efficiently cooled and more easily changed and adjusted.

BACKGROUND OF THE INVENTION

The typical metal working lathe is equipped with a vertical rotary turret tailstock having multiple tool blocks upon which to mount metal working tools. The rotary turret tailstock selectively positions tool blocks with their mounted tools at a work piece, according to the operator's direction. The tool blocks are typically equipped-with slots and clamping bolts to hold metal working tools with rectangular shanks, or with collets and adjustable stops to hold metal working tools with round shanks. Rotary turret tailstock tool blocks are also typically equipped with internal channels that allow coolants to flow from the rotary turret tailstock through the tool blocks to two adjustable coolant jets that are positioned on the face of the tool block. The coolant jets are positioned so that their coolant streams may be adjusted to converge their flows on a working tool at its point of contact with a work piece. The coolant jets may need to be readjusted with each change in the working tool in a tool holder or with each adjustment of a work tool's orientation.

SUMMARY OF THE INVENTION

The present invention eliminates the need for adjustable coolant jets in the face of tool blocks that are mounted to vertical rotary turret tailstocks and that hold metal working tools with collets. The tool holder and block for metal working lathes of the present invention provides for redirecting coolant flow from the coolant jets of the prior art to flow directly through and exit from the nose of the collet. Coolant then exits the collet through the collet slits on the nose of the collet and cascades onto the working tool and work piece. The redirected coolant flow is possible through the use of a novel draw nut that replaces the adjustable stops of the prior art for the collet, and which also provides a novel means to quickly change or adjust the metal working tool in the collet. An optional coolant cap removably placed over the collet further redirects the coolant flow directly down the shaft of the working tool and onto the work piece.

One embodiment of the tool block and holder for metal working lathes of the present invention is a tool block and holder for metal working lathes, comprising, a tool block having a tool channel extending therethrough sized to receive snugly a collet holder with a collar at its proximate end serving as a stop against the tool block, and first coolant channel means that communicates a fluid coolant from a source external to the tool block to the tool channel at a point beyond the distal end of the collet holder; a collet sized to be received snugly within the collet holder and having a hollow interior and a nose at its proximate end with an opening sized to receive the shank of a metal working tool and having male threads at its distal end; and a draw nut having a proximate end sized to be received snugly within the tool channel, female threads at its proximate end sized to receive the male threads at the distal end of the collet, a flange at the distal end of the draw nut serving as a stop against the tool block, and second coolant channel means in fluid communication with the first coolant channel means and the hollow interior of the collet when the flange of has been stopped against the tool block.

Another embodiment of the present invention is a tool block and holder for metal working lathes as described above and further comprising a coolant cap removably attached to the collar of the collet holder that is in fluid communication with the first hollow interior of the collet and having means to redirect fluid coolant flow from the hollow interior of the collet to focus fluid flow whereby it totally surrounds a metal working tool received within the nose of the collet.

An object of the present invention is to provide more efficient flow of fluid coolants over metal working tools for metal lathes.

Another object of the present invention is to prove a quick and efficient means to change or adjust metal working tools for metal lathes that are held by collets.

BRIEF DESCRIPTION OF THE DRAWING FIGURESE

DESCRIPTION OF THE PREFERRED EMBODIMENT

Figure 1:
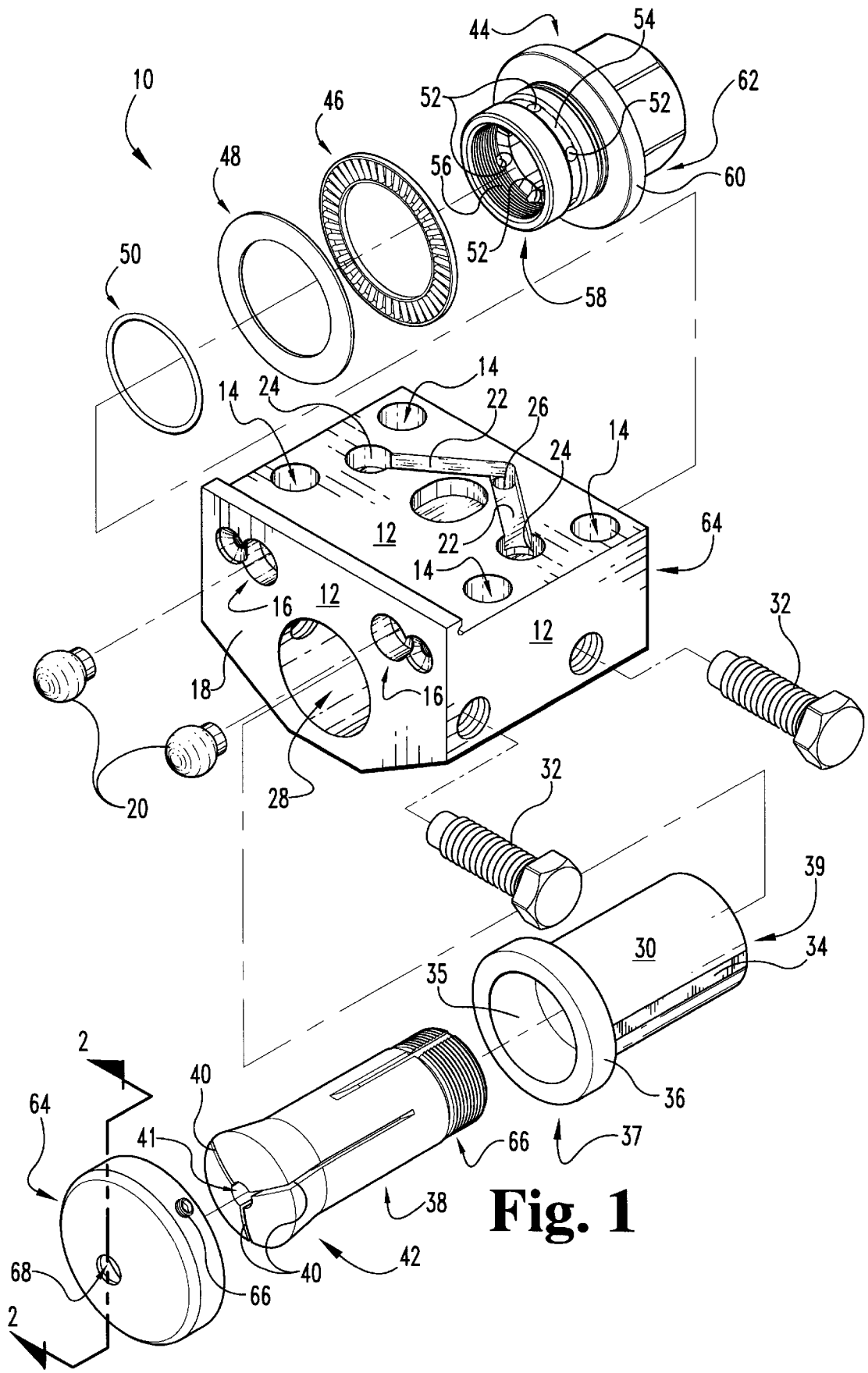
FIG. 1 is an exploded view of the tool block and holder for metal working lathes of the present invention.

Referring now to the drawings, the principal components of a preferred embodiment of the tool block and holder for metal working lathes 10 of the present invention are illustrated in FIGS. 1–4.

Tool block 12 of the illustrated preferred embodiment is a standard tool block for a vertical rotary turret tailstock of a CNC 2-axis lathe that has been modified to accommodate the present invention, as will be discussed below. Tool block 12 has 4 conventional through holes 14 through which bolts attach the tool block to the turret tailstock in the conventional manner. Coolant jets normally positioned at locations 16 on the face 18 of the tool block 12 have been replaced with plugs 20. New coolant channels 22 have been provided from the conventional coolant inlets 24 on tool block 12 through which coolant flows to block 12 from a source within the rotary turret tailstock. Channels 22 communicate fluid coolant to a new coolant through hole 26 located to the rear of tool block 12. Channels 22 and through-hole 26 combine to communicate fluid coolant to the tool channel 28 of tool block 12 at a point beyond the distal end 39 of collet holder 30 when collet holder 30 is fully received within tool channel 28, about which more will be said below.

In the preferred embodiment illustrated, a conventional 5C collet holder 30 is snugly slipped into the front of tool channel 28 at the face 18 of tool block 12 and is secured in position with two conventional threaded bolts 32 that are turned down against a flat spot 34 machined onto the collet holder 30. Once the collet holder 30 is so installed in the tool block 12, the collet holder does not need to be removed to effectuate working tool adjustments or changes. Collet holder 30 is provided with a collar 36 with an interior taper 35 at its proximate end 37 that provides a stop against the face 18 of tool block 12.

A conventional 5C collet 38, which has a hollow interior, may then be snugly slid into collet holder 30. As illustrated in FIG. 1, collet 38 has three slits 40 that permit the nose 42 of collet 38 to compress as collet 30 is drawn into the taper 35 of collar 36 of collet holder 30 by draw nut 44, in the manner described below.

Figure 2:
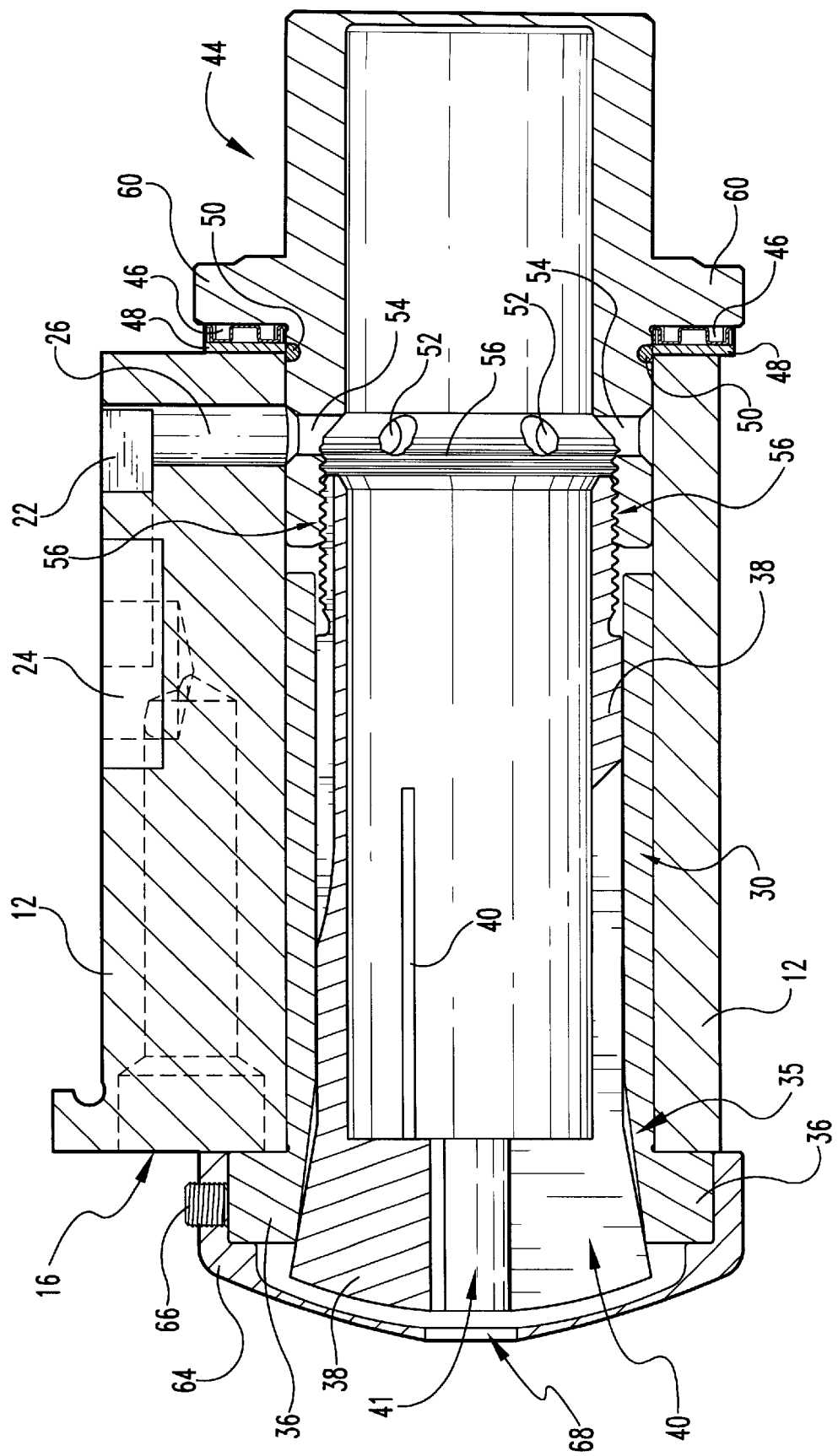
FIG. 2 is a cross sectional view of the tool holder of FIG. 1 taken along line 2—2 of FIG. 1, which shows the assembled tool holder and tool block.
Figure 3:
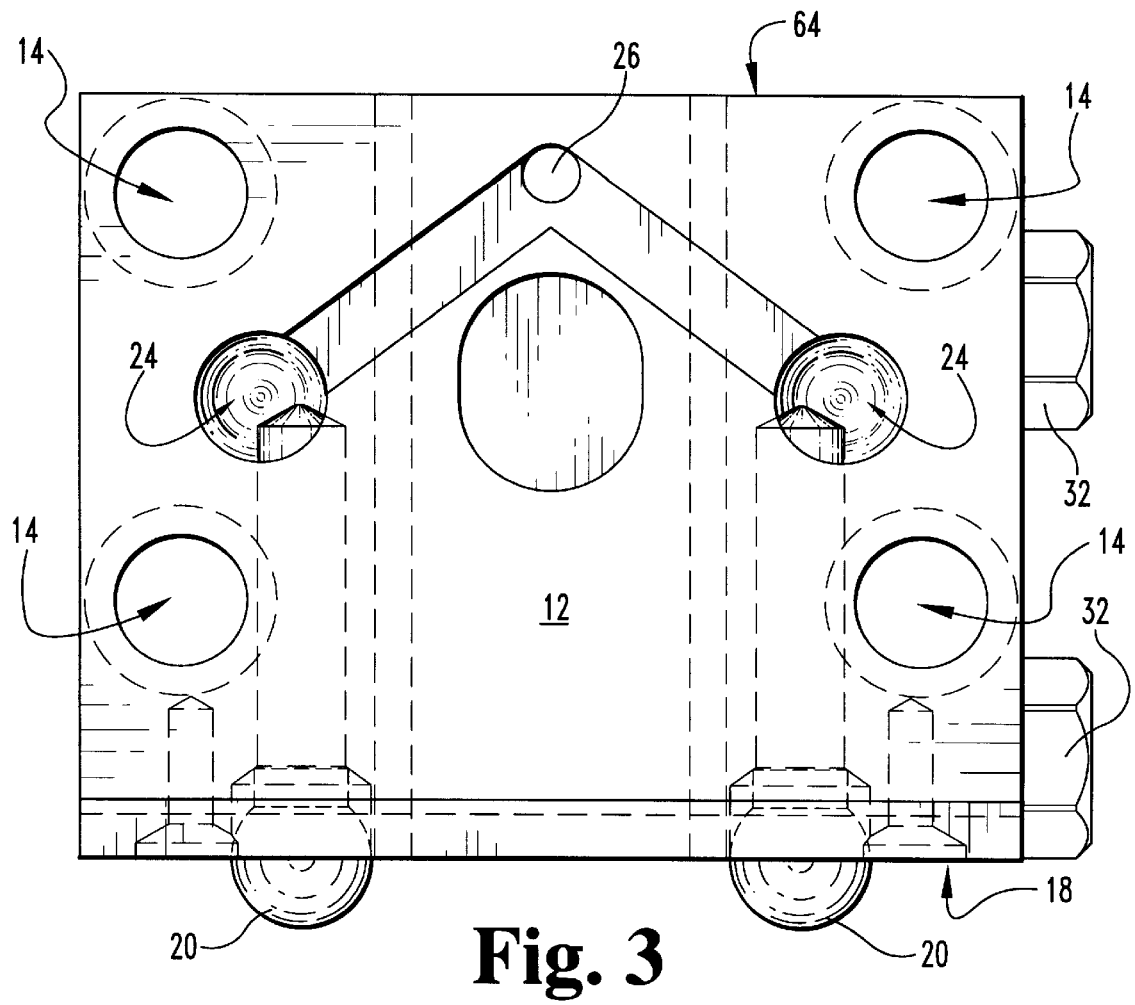
FIG. 3 is top view of the tool block of FIG. 1.
Figure 4:
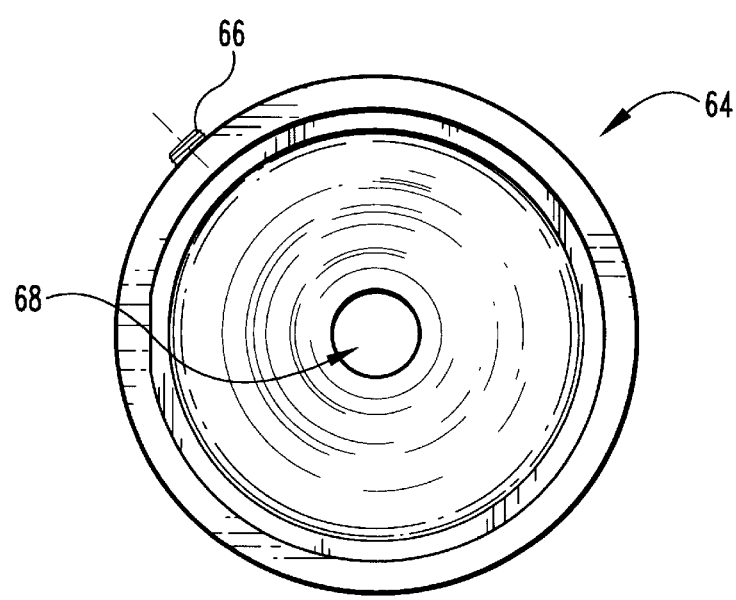
FIG. 4 is rear view of the coolant cap 64 of FIG. 1.

Draw nut 44, the components of which are illustrated in FIGS. 1–2, includes a needle roller thrust bearing 46, a flat washer 48, and an O-ring 50. O-ring 50 serves two purposes, one to hold the washer 48 and thrust bearing 46 in place on draw nut 44, as illustrated, and the other to provide a seal against coolant leakage from the tool channel from around draw nut 44 when it is fully in place, as will be discussed below. Draw nut 44 has holes 52 drilled through and through in a recessed channel 54 just above its internal female threads 56, which holes 52 and recessed channel 54 are in fluid communication with coolant channels 22 and coolant through-hole 26 when the proximate end 58 of draw nut 44 has been snugly received within tool channel 28 into tool channel 28 from the rear face 64 of tool block 12 and the tool is ready for use. Coolant may then flow into the hollow interior portion of the draw nut 44 when draw nut 44 has been fully received within tool channel 28 and flange 60 at the distal end 62 of draw nut 44 abuts the rear face 64 of tool block 18. The internal female threads 56 of draw nut 44 are sized to correspond to the standard male threads 66 of collet 38.

Collet 38, with a tool having a circular shank inserted therein (not shown) through opening 41 in the conventional manner, is snugly slipped into collet holder 30, and the female threads 58 on draw nut 44 receive the male threads 66 on collet 38. The draw nut 44 is then turned to draw male threads 66 into female thread 58. The nose 42 of collet 38 is then drawn down tight against the tool as the nose 42 of collet 38 is drawn into collet holder 30 in the conventional manner. Washer 48 stops turning against the back face 64 of the tool block 12 while the needle roller thrust bearing 46 continues to turn as the draw nut 44 is further turned and tightened, to thereby prevent the draw nut 44 from damaging or scoring the back face 64 of the tool block 12. The draw nut 44 may be snugly tightened with a conventional socket wrench.

As mentioned above, fluid coolant is conventionally channeled through tool block 12 from a source within the rotary turret tailstock to inlets 24 and through conventional channels within tool block 12 to locations 16 on either side of the collet sleeve 30 on the face 18 of the tool block 12, from where fluid coolant would conventionally exit the block through conventional coolant jets (not shown). According to the present invention, locations 16 are sealed with stoppers 20, and new channels 22 are routed to direct the flow of fluid coolant from the conventional coolant inlets 24 rearward toward the back face 64 of the tool block 12 to a new through-hole 26 that is in fluid communication with the channels 22. Fluid coolant then flows through the channels 22 to through-hole 26, which itself is in fluid communication with the channel 54 in draw nut 44 and through-holes 52, thereby allowing fluid coolant to flow into the hollow interior of draw nut 44 and thus into the hollow interior of the collet 38. The fluid coolant then exits through the nose 42 of the collet 38 through slits 40, which results in fluid coolant automatically cascading onto any work piece that is contacted by a tool mounted in the collet 38, without the need to adjust coolant jets. Optionally, a coolant cap 64 is snugly attached to the collar 36 of collet holder 30 with a set screw 66. Coolant cap 64 has a single opening 68 that is slightly larger that the diameter of the shank of working tool mounted in collet 38, which redirects the cascading fluid coolant exiting the slits 40 in the nose 42 of collet 38 to the opening 68, which results in a focused flow of fluid coolant that totally surrounds the working tool and focuses the fluid coolant flow on the work piece at the point of contact with a working tool mounted in collet 38.

A principal benefit of the present invention is that fluid coolant may be automatically directed to its most efficient contact with a working tool and a work piece, thereby eliminating the need to adjust coolant jets as in the prior art.

Another principal benefit of the present invention is that when working tools need to be adjusted or changed, the draw nut 44 just needs to be loosened slightly with a wrench. A tool within the collet 38 will then be freed of the arresting contact of nose 42 and of collet 38 and may then be quickly adjusted, or the entire collet and tool combination may be quickly removed or be replaced, thereby shaving a great deal of time off the time normally required to replace metal working lathe tools.

I claim:

1. A tool block and holder for metal working lathes, comprising, a tool block having a tool channel extending therethrough sized to receive snugly a collet holder with a distal end and a collar at its proximate end serving as a stop against the tool block, and first coolant channel means that communicates a fluid coolant from a source external to the tool block to the tool channel at a point beyond the distal end of the collet holder;

a collet sized to be received snugly within the collet holder and having a first hollow interior and a nose at its proximate end with an opening sized to receive the shank of a metal working tool and having male threads at its distal end; and a draw nut having a proximate end sized to be received snugly within the tool channel, female threads at its proximate end sized to receive the male threads at the distal end of the collet, a flange at the distal end of the draw nut external to said tool block serving as a stop against the tool block, and second coolant channel means in fluid communication with the first coolant channel means and the hollow interior of the collet when the flange has been stopped against the tool block.

2. The tool block and holder of claim 1, and further comprising a coolant cap removably attached to the collar of the collet holder that is in fluid communication with the first hollow interior of the collet and having means to redirect fluid coolant to flow from the first hollow interior of the collet to focus fluid whereby it totally surrounds a metal working tool received within the nose of the collet.

3. The tool block and holder of claim 1, wherein the draw nut further comprises means to seal the draw nut to prevent fluid coolant from leaking from the hollow interior of the collet when the proximate end of the draw nut has been fully received within the tool channel.

4. The tool block and holder of claim 3, wherein the draw nut further comprises a thrust washer between the flange of the draw nut and the tool block and a flat washer between the thrust washer and the tool block.

* * * * *